United States Patent [19]

Tsushima et al.

[11] Patent Number: 5,274,490
[45] Date of Patent: *Dec. 28, 1993

[54] OPTICAL TRANSMITTER, OPTICAL RECEIVER AND OPTICAL TRANSMISSION APPARATUS AND CONTROL METHOD OF OPTICAL RECEIVER

[75] Inventors: Hideaki Tsushima, Hachioji; Shinya Sasaki, Kodaira, both of Japan

[73] Assignee: Hitachi, Ltd., Tokyo, Japan

[*] Notice: The portion of the term of this patent subsequent to Jun. 11, 2008 has been disclaimed.

[21] Appl. No.: 693,584

[22] Filed: Apr. 30, 1991

Related U.S. Application Data

[63] Continuation of Ser. No. 298,946, Jan. 19, 1989, Pat. No. 5,023,750.

[30] Foreign Application Priority Data

Jan. 20, 1988 [JP] Japan .................. 63-8314

[51] Int. Cl.$^5$ ............ H04B 10/04; H04B 10/06
[52] U.S. Cl. .................. 359/191; 359/182; 359/185; 359/173
[58] Field of Search ........... 359/173, 180, 181, 182, 359/184, 185, 188, 191, 195

[56] References Cited

FOREIGN PATENT DOCUMENTS 136663 4/1985 European Pat. Off. .
145972 6/1985 European Pat. Off. .
62-18133 1/1987 Japan .

OTHER PUBLICATIONS

Emura et al; "System Design and Long-Span Transmission . . . Detection System"; Journal of Lightwave Tech., vol. Lt-5, No. 4, Apr. 1987, pp. 469-477.
J. Buchner; "Ternary line codes", Philips Telecommunication Review, vol. 34, No. 2, Jun. 1976, pp. 72-86.
Vodhanel et al, Journal Of Lightwave Technology, "FSK Heterodyne Transmission Experiments at 560 Mbit/s and 1 Gbit/s", vol. LT-5, No. 4, Apr. 1987, pp. 461-468.
Emura et al, Electronic Letters, "Over 300 km Transmission Experiment on an Optical FSK Heterodyne Dual Filter Detection System", vol. 22, No. 21, Oct. 9, 1986, pp. 1096-1097.
Tsushima et al, The Transactions of the IEICE, "Improvement of Polarization Diversity Method for Heterodyne/Coherent Optical Transmission Systems", vol. E70, No. 7, Jul. 1987, pp. 608-610.
Enning, "Bipolar FSK Heterodyne Transmission Experiment at 150 Mbit/s Using a Directly Modulated Unequalized DFB Laser", OFC 1988 p. 14.

Primary Examiner—Leslie Pascal
Attorney, Agent, or Firm—Fay, Sharpe, Beall, Fagan, Minnich & McKee

[57] ABSTRACT

A unipolar original electrical signal is encoded by alternate mark inversion and combined with a DC bias current for injection of a semiconductor laser to produce a bipolar FSK optical signal that is transmitted to a receiver. At the receiver, the received signal is coupled with optical local power and fed to an optical/electrical transducer, preferably a semiconductor, to produce an electrical signal that is demodulated to produce the original unipolar signal. The demodulator may be of different types, for example employing delaying part of the amplified electrical signal and mixing the delayed part with the original signal for passage of the combined signal through a low pass filter; with proper selection of the delay, an AMI decoder is not needed. The demodulator may also be of the type that has one or more band pass filters to respectively separate the positive mark, space and negative mark signals that may thereafter be added. Filtering and polarization beam splitting may also be used in the demodulator for improving the signal-to-noise ratio and preventing other types of degradation.

5 Claims, 10 Drawing Sheets

OPTICAL TRANSMITTER, OPTICAL RECEIVER AND OPTICAL TRANSMISSION APPARATUS AND CONTROL METHOD OF OPTICAL RECEIVER

The present application is a continuation of Ser. No. 298,946, now U.S. Pat. No. 5,023,950 filed Jan. 19, 1989 for OPTICAL TRANSMITTER, OPTICAL RECEIVER AND OPTICAL TRANSMISSION APPARATUS AND CONTROL METHOD OF OPTICAL RECEIVER.

BACKGROUND OF THE INVENTION

The present invention relates to optical transmission, including an optical transmitter and an optical receiver, particularly for FSK, frequency shift keying of the optical signal.

SUMMARY OF THE INVENTION

It is an object of the present invention to provide FSK optical signal transmission and reception with less wave form distortion than previously provided when the modulation frequency characteristics of the optical frequency deviation of the semiconductor laser used in the apparatus is not uniform.

A unipolar original electrical signal is encoded by alternate mark inversion and combined with a DC bias current for injection of a semiconductor laser to produce a bipolar FSK optical signal that is transmitted to a receiver. At the receiver, the received signal is coupled with optical local power and fed to an optical/electrical transducer, preferably a semiconductor, to produce an electrical signal that is demodulated to produce the original unipolar signal. The demodulator may be of different types, for example employing delaying part of the amplified electrical signal and mixing the delayed part with the original signal for passage of the combined signal through a low pass filter; with proper selection of the delay, an AMI demodulator is not needed. The demodulator may also be of the type that has one or more band pass filters to respectively separate the positive mark, space and negative mark signals that may thereafter be added; filtering and polarization beam splitting may also be used in the demodulator for improving the signal-to-noise ratio and preventing other types of degradation.

BRIEF DESCRIPTION OF THE DRAWINGS

Further objects, features and advantages of the present invention will become more clear from the following detailed description of a preferred embodiment, shown in the drawing, wherein:

FIG. 4 is a diagram showing power density spectra of a NRZ signal and an AMI-coded signal, respectively in FIGS. 4(a) and 4(b);

DETAILED DESCRIPTION OF THE PREFERRED EMBODIMENT

The optical communication system of the present invention employs an optical transmitter, a conventional transmission path such as an optical fiber, and an optical receiver. The transmitter and receiver are suitable for FSK optical signals (frequency shift keying signals).

Figure 2:
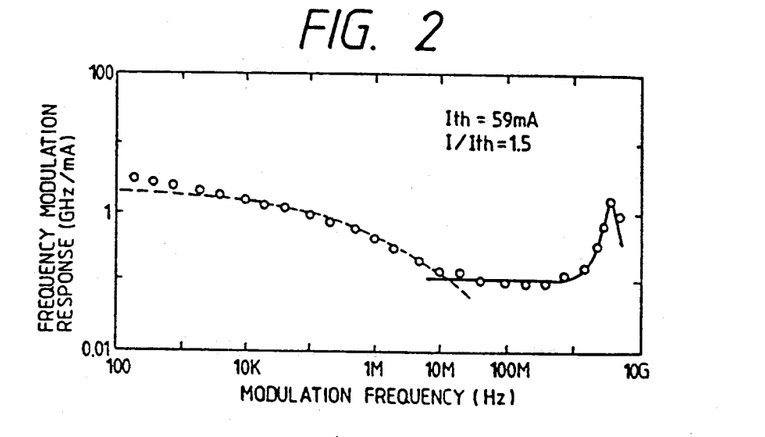
FIG. 2 is a diagram of typical modulation frequency characteristics of an optical frequency deviation of a semiconductor laser.

Injection current modulation frequency characteristics (hereinafter referred to as the frequency characteristics) of optical frequency deviation of semiconductor lasers are ordinarily not uniform. FIG. 2 shows typical frequency characteristics, and details of these characteristics as shown in this drawing are discussed in IEEE, Journal of Quantum Electronics, QE-19, No. 2, February, 1983, pp. 180-193. In FIG. 2, the circle marks represent measured values, whereas the dash line represents a theoretical value that takes a thermal effect into account. The solid line represents a theoretical value that takes a carrier effect into account. The threshold current $I_{th}$ of the semiconductor laser is 59mA and the bias current $I_b$ has the relationship such that $I_b/I_{th}=1.5$.

As shown in FIG. 2, the FM response sensitivity below several or 10 MHz is higher than that at higher frequencies. Therefore, if the semiconductor laser is directly modulated by a unipolar signal, such as a Non-Return-to-Zero (NRZ) above a few mega-bits (Mb/s) whose frequency spectrum is widely distributed from near direct current to above a few MHz, the wave form of the output FSK optical signal gets distorted. A unipolar signal may be set at a value representing a high state for enough consecutive pulses that, during such time, it will effectively be a DC current having zero frequency. The same would be true of a number of consecutively placed low signals. The unipolar signal would have a low frequency when consecutive highs and consecutive lows are interspersed, and a high frequency when the unipolar signal alternates between high and low bits. Thus, it is seen that the frequency range of the unipolar signal can vary from zero to the highest frequency of the bits per second. Therefore, it is seen that the response characteristics would vary widely according to FIG. 2, and at the receiving end there would be distortion as a result.

Figure 3:
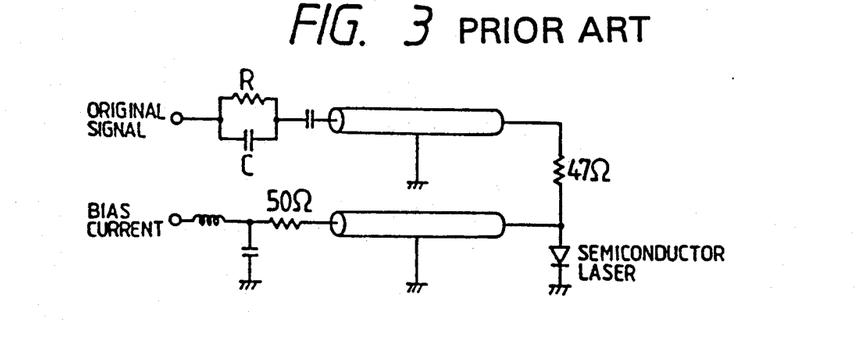
FIG. 3 is a schematic useful in analyzing a transmitter not employing the features of the present invention.

This distortion problem may be solved by the use of a pre-equalizer circuit. As shown in FIG. 3, a unipolar original signal is equalized by a preequalizer circuit consisting of a parallel circuit of a resistor R and a capacitor C, and is then superposed on a bias current to directly modulate the semiconductor laser. The frequency characteristics below a few MHz can be made uniform by use of the circuit shown in FIG. 3 and wave form distortion of the FSK optical signal can be reduced. Details of this circuit and its operation are set forth in the above-described literature.

The above-described technique of optical communication involving the characteristics of FIG. 2 and pre-equalization involve the following problems:

(1) Since the frequency characteristics of the optical frequency deviation vary from semiconductor laser to semiconductor laser, the preequalizer circuit must be adjusted individually in accordance with the individual semiconductor laser characteristics so that the cost of production of an optical transmitter increases.

(2) Since the frequency characteristics are made uniform by the preequalizer that flattens the response characteristics and thereby cuts off the power above the flatness, by limiting FM response sensitivity, response sensitivity thereby drops because the overall power of the signal has dropped. As a result, the power of the original signal must be increased, which increases the transmitter circuit costs and transmitter power costs.

(3) The mean frequency of the FSK optical signals changes with the pattern of the signal so that the DC level of the demodulation signal obtained by the optical receiver changes accordingly.

It is an object of the present invention to provide an optical transmitter and optical receiver that solves these problems and is suitable for transmitting an FSK optical signal having less wave form distortion. The first problem is solved by not employing a preequalizer circuit so that no adjustments are necessary and therefore production cost is not increased by such adjustments. The second problem is also solved by not providing a pre-equalization. The third problem is not encountered because the present invention uses alternate mark inversion that provides a constant average value. In general, the frequency deviation characteristics shown in FIG. 2 are not particularly troublesome with the present invention, because the frequency range employed in the present invention is very limited as compared to the use of a unipolar signal, because alternate mark inversion converts the wide frequency range of the unipolar signal into a relatively small frequency range and accordingly provides less deviation in accordance with the characteristics of FIG. 2.

The present invention converts a unipolar original signal, such as a NRZ signal to a bi-polar signal by alternate mark inversion (AMI) encoding, and thereafter superposing the bi-polar signal on a bias current and directly modulating a semiconductor laser by this superposition signal for the transmitter.

The optical receiver of the present invention can be accomplished by any one of the following three basic constructions:

(1) The FSK electrical signal obtained by heterodyne detection of the FSK optical signal described above is converted to a baseband signal by a frequency discriminator and is converted to a unipolar signal by an AMI decoder to obtain a demodulation signal.

(2) The FSK electrical signal obtained by the heterodyne detection of the FSK optical signal described above is converted to a baseband signal by a delay detector whose delay time is substantially $n/2f_s$ (where n is a natural number or 0, and $f_s$ is a frequency corresponding to the space signal of the FSK electrical signal) and at the same time, converted to a unipolar signal to obtain a demodulation signal.

(3) The FSK signal obtained by the heterodyne detection of the FSK optical signal described above is separated to a positive mark signal, a negative mark signal and a space signal by three band pass filters having mutually different center frequencies, with their components being converted to the baseband signals by envelope detectors and the baseband signals are added or subtracted and outputted as a demodulation signal.

In the balanced optical receiver of the present invention, the optical signal and optical local power are combined by a 3 dB optical coupler or couplers and each combined light signal is heterodyne-detected and then subtracted to obtain one FSK electrical signal. The demodulation signal can be obtained from the FSK electrical signal by use of a demodulator having any one of the constructions as described in the immediately preceding items (1) to (3).

In the polarization diversity optical receiver of the present invention, the combined light signal, after combining the optical signal and the local oscillation light signal, is separated into two polarization components that cross each other orthogonally by a polarization beam splitter, and the separated light beams are each heterodyne-detected. The resulting two FSK electrical signals are converted to the unipolar signals by the demodulation of any one of the immediately preceding items (1) to (3), respectively, and the two unipolar signals are added to obtain a demodulation signal.

The balanced polarization diversity of the present invention consists of the combination of the balanced optical receiver and polarization diversity optical receiver described above.

The optical transmission apparatus of the present invention comprises the combination of the optical transmitter described above and any one of the optical receivers described above.

Automatic frequency control, according to the present invention, comprises separating part of the FSK electrical signal, described above, extracting a positive mark signal, extracting a negative mark signal or extracting a space signal from the separated signal, branching the components into two components, subjecting one of the components to high-pass filtration and the other component to low-pass filtration, detecting the envelopes of these two filtration signals, respectively, and controlling the frequency of a local oscillation light source so that their amplitudes are substantially in conformance with each other.

Figure 4A:
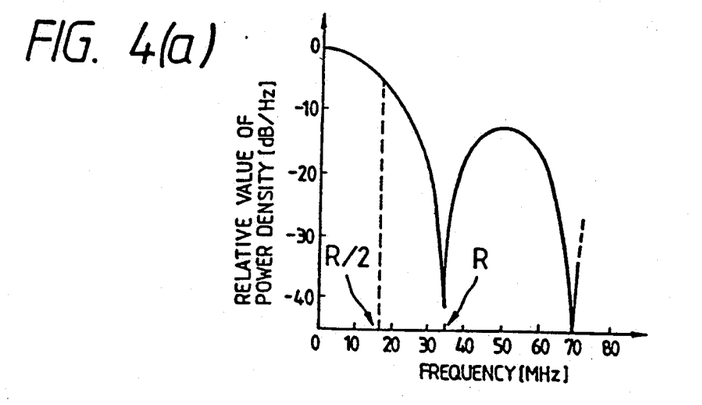
Figure 4B:
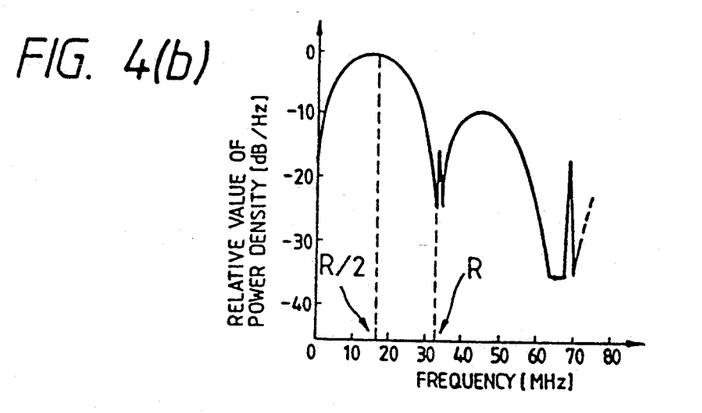

FIGS. 4(a) and 4(b) show a comparison of the power density spectra for a pseudo random pattern. The diagram represents the case where a bit rate is r=34 Mb/s. FIG. 4(a) represents the spectrum of a unipolar original signal, and FIG. 4(b) represents the spectrum of a bi-polar signal that is AMI-encoded according to the present invention.

As can be seen clearly from FIG. 4(a), the spectrum of the unipolar original signal is distributed widely from near a direct current to a frequency R, and exhibits the maximum value near the direct current. In other words, if a bias current is superposed on the unipolar signal and is used as the modulation current of a semiconductor laser, the wave form of the output FSK optical signal gets distorted.

On the other hand, as shown in FIG. 4(b), the spectrum of the AMI encoded bi-polar signal according to the present invention is close to zero in value for a direct current and exhibits the maximum value at a frequency of R/2. In other words, if the original signal is AMI encoded according to the present invention, the power density spectrum when the signal becomes concentrated in the region where the frequency characteristics of optical frequency deviation of the semiconductor laser are uniform, distortion of the FSK optical signal can be reduced drastically. FIG. 4(b) shows the case where the duration of the mark signal is 50%, but the shape of the spectrum is substantially the same even where duration assumes a different value, such as 100%.

In the present specification, the AMI decoder is ultimately referred to as a demodulator. Optical frequency deviation, refers to the frequency response shown in FIG. 2. As shown in FIG. 2 the optical frequency deviation depends on the modulation frequency, except in the frequency range from several mega-hertz (MHz) to a few giga-hertz (GHz). The power spectrum of more than several mega bit (Mb/s) signals using NRZ or return to zero (RZ) format, which is used in conventional optical communication systems, broadens the spectrum from near direct current to more than several mega-hertz. If the semiconductor laser is modulated by such a signal, conventionally, the wave form of the output FSK optical signal gets distorted because the optical frequency deviation is not uniform according to the modulation frequency change. As mentioned, pre-equalization may be employed according to conventional techniques. However, by suppressing the low frequency component of the signal, the efficiency of the optical frequency deviation drops.

Figure 1:
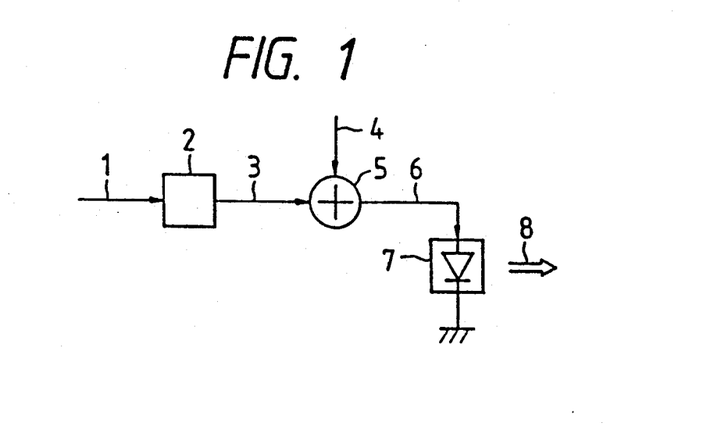
FIG. 1 shows the basic construction of the transmitter of the optical system according to the present invention.

In FIG. 1, a unipolar original signal 1 is inputted to an AMI (alternate mark inversion) encoder 2. The output of the encoder is a bi-polar signal 3 fed to a superposer 5, where it is superposed on a bias current 4. Superposer 5 may be a bias tee. This superposition signal 6 is injected to a semiconductor laser 7 and as a result a bipolar FSK optical signal 8 is outputted.

Figure 5:
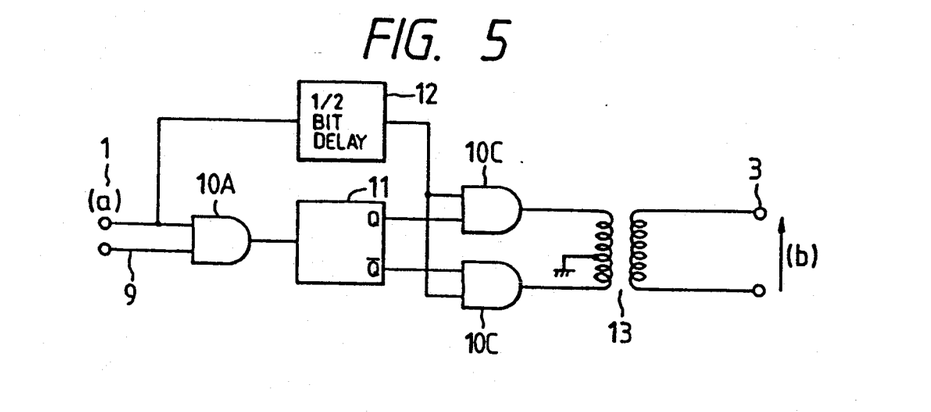
FIG. 5 shows details of the AMI encoder of FIG. 1.

The AMI encoder 2, of FIG. 1, may be of the type as shown in the circuit of FIG. 5, for example. In FIG. 5, the original signal 1 and a trigger signal 9 are inputted to an AND circuit 10A. The output of the AND circuit 10A is inputted to a trigger type flip-flop 11. The two outputs of the flip-flop 11 are inputted to AND circuits 10B and 10C, respectively. The output of a ½-bit delayed device 12 is also inputted to the AND circuits 10b, 10c, in common. The ½-bit delay device receives as an input the unipolar signal 1, and delays this signal by a time equal to the time period of ½-bit, prior to feeding the delayed signal to the AND gates 10B and 10C. The outputs of the AND circuits 10B and 10C are passed through transformer 13 to obtain the bi-polar signal 3 at output (b). Therefore, at input (a) the unipolar signal is received and converted to a bi-polar signal at output (b).

Figure 6A:
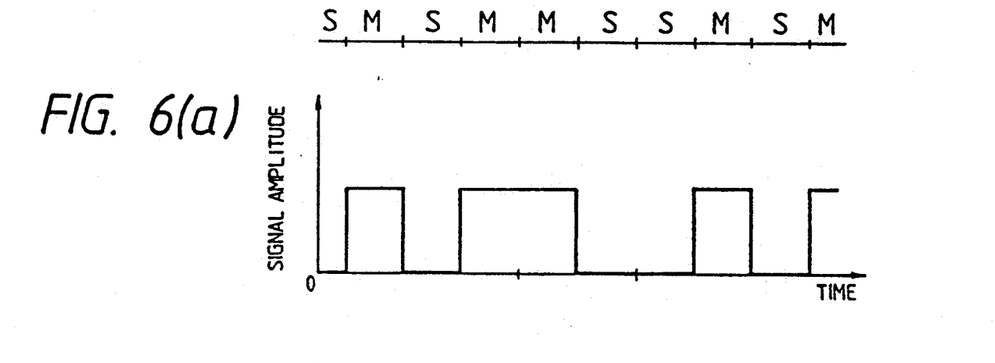
FIGS. 6(a), 6(b), and 6(c) show signal wave forms at different locations of the apparatus according to the present invention.
Figure 6B:
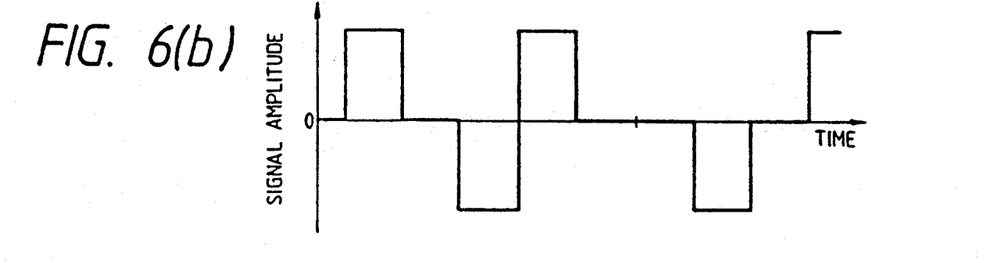
Figure 6C:
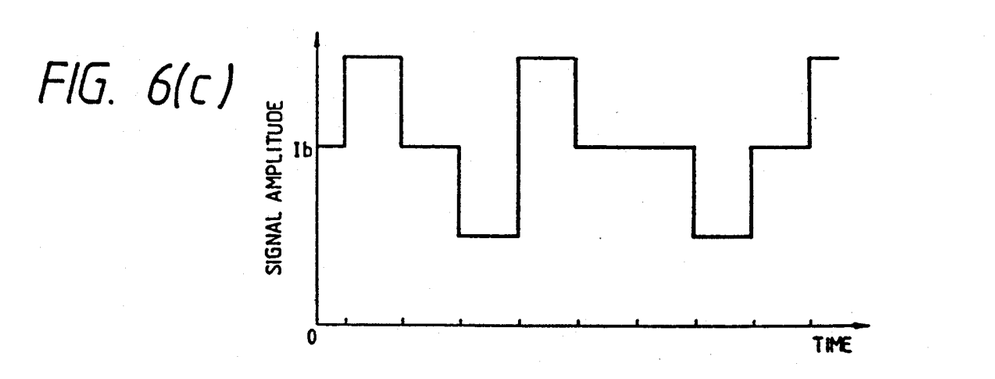

FIGS. 6(a), 6(b) and 6(c) show the wave forms of the signals 1, 3 and 6, respectively, which are shown in FIG. 1. In FIG. 6(a) the symbols S and M respectively represent the space and mark signals of the original unipolar signal. As shown in FIG. 6(b), the polarity inverts for every other mark signal, with respect to the illustrated signal 3, which is the output from the circuit of FIG. 5, for example. In this specification, the mark signal having a positive polarity and the mark signal having a negative polarity will be referred to as the "positive mark signal" and the "negative mark signal", respectively. FIG. 6(c) shows the wave form of the signal 6 and its mean value is in agreement with the bias current 9 having value $I_b$. As a result, the mean frequency of the FSK optical signal 8 becomes constant.

This embodiment provides the following effects:

(1) Adjustment of the circuit in accordance with the characteristics of each semiconductor laser becomes unnecessary. This is because the power density spectrum of the signal injected to the semiconductor laser can be shifted from near the direct current to the frequency range desired by the AMI encoder as described already with reference to FIG. 4. Ordinary semiconductor lasers exhibit substantially uniform frequency characteristics at substantial modulation frequencies, as described previously. Therefore, if the transmission speed is above several tens of Mb/s, that is above several times 10,000,000 bits/second, the major portion of the spectrum of the signal concentrates on the flat frequency range described above. As a result, wave form distortion of the FSK optical signal can be reduced.

(2) Sensitivity does not drop because equalization is not made. As a result, there is no need to increase the power of the original signal, as was necessary prior to the present invention, as described previously.

(3) The DC level of the modulation signal obtained by the optical receiver becomes constant, because the mean frequency of the FSK optical signal is constant, due to the alternate mark inversion.

Figure 7:
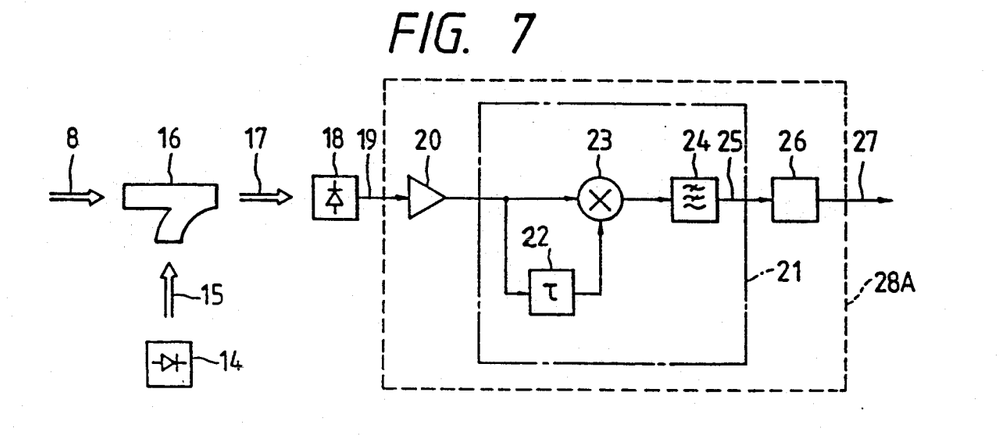
FIG. 7 illustrates an optical receiver according to the present invention.

FIG. 7 discloses an embodiment of the optical receiver, which can be used together with the transmitter of FIG. 1, as a communication system, with the transmitter of FIG. 1 employing the AMI of FIG. 5. In FIG. 7, the FSK optical signal 8 is combined with the optical local power 15 generated from the local oscillation light source 14. The local oscillator 14 may be, as indicated, of the semiconductor type, based upon the frequency principals of a superheterodyne process. The combination of signals 8 and 15 is obtained with the optical coupler 16, to produce the combined light signal 17 that is directed into the optical detector 18. The optical detector 18 is preferably of a semiconductor type transducer, which outputs FSK electrical signal 19. The signal 19 is amplified by the amplifier 20 and inputted to the frequency discriminator 21. The discriminator 21 can be composed of a delay detector 22, for example. The delay detector 22 branches the output signal of the amplifier 20 into two components. One of the components is immediately inputted to the frequency mixer 23, and the other component from the delay detector 22 is inputted to the mixer 23 after a delay of time determined by the characteristics of the delay detector 22. The output of the frequency mixer 23 is inputted into the low-pass filter 24 to remove the high frequency component and to output a bi-polar baseband signal 25. The signal 25 is inputted to the AMI decoder 26, which outputs a unipolar signal, that is, a demodulation signal 27. In the drawing, the discriminator, as indicated by the dot-lines, includes elements 22, 23, 24, whereas the demodulator 28A includes the discriminator 21 as well as the components 20, 26, as indicated by the dash-lines. Thus, the demodulator 28A demodulates the FSK electrical signal, in a manner that is known per se with respect to conventional radio transmission, for example. It is possible to change the insertion position on the amplifier 20 or to omit the AMI decoder 26. The delay time can be determined appropriately in accordance with the transmission speed and the conditions of FSK modulation.

Figure 8A:
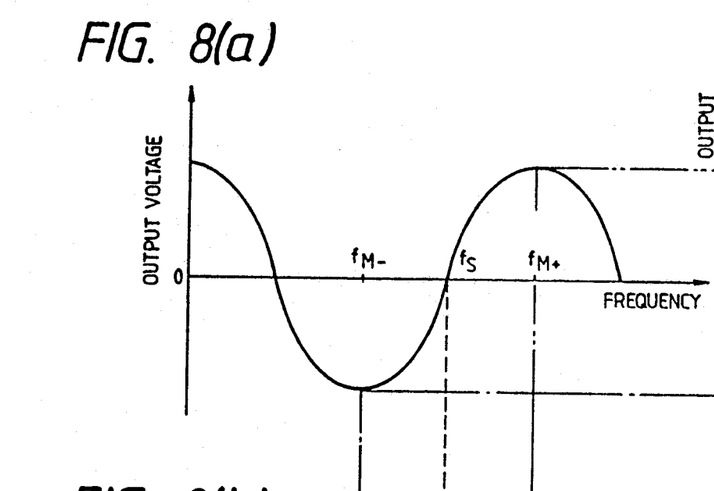
FIGS. 8(a), 8(b) and 8(c) show wave forms at different locations in the apparatus of the present invention.
Figure 8B:
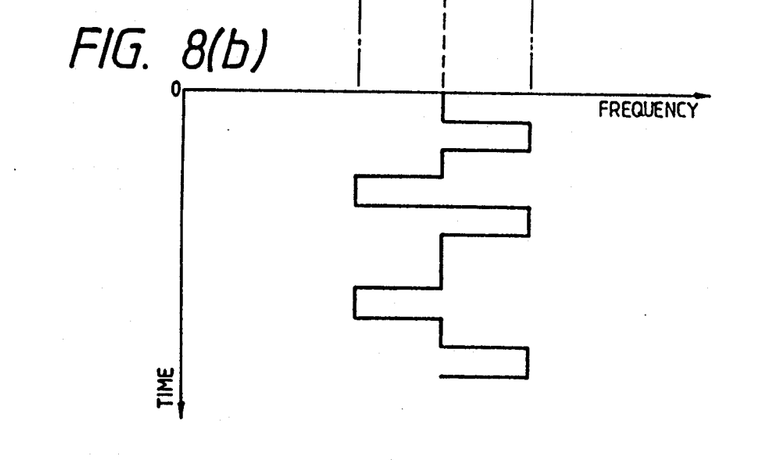
Figure 8C:
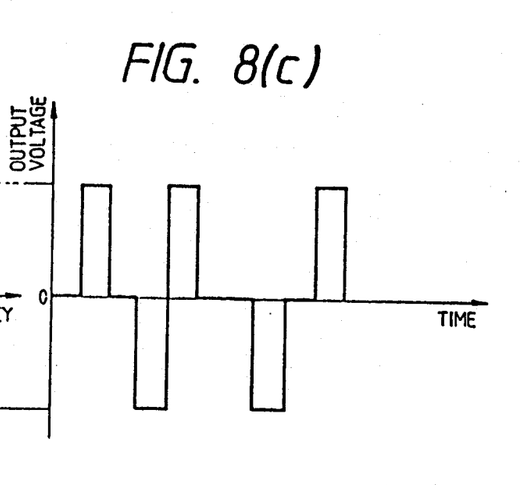

FIGS. 8(a), 8(b) and 8(c) show the frequency discrimination characteristics of the discriminator 21 and the wave form examples of the signals 19 and 25. In these diagrams, $f_s$, $f_{m+}$ and $f_m$ represent the space signal, positive mark signal and negative mark signal, respectively, of the signal 19. The modulation signal of FIG. 8(c) can be obtained from the FSK electrical signal of FIG. 8(b) by setting each frequency of the signal as shown in FIG. 8(a).

The signal 25 as shown in FIG. 8(c) has the same wave form as that of the signal 3 in the optical transmitter of the present invention, and the demodulated signal 27 can be obtained by the AMI decoder 26.

In accordance with the present invention, then the FSK optical signal outputted from the optical transmitter is received and the demodulation signal obtained using an optical receiver of simple construction.

Figure 9:
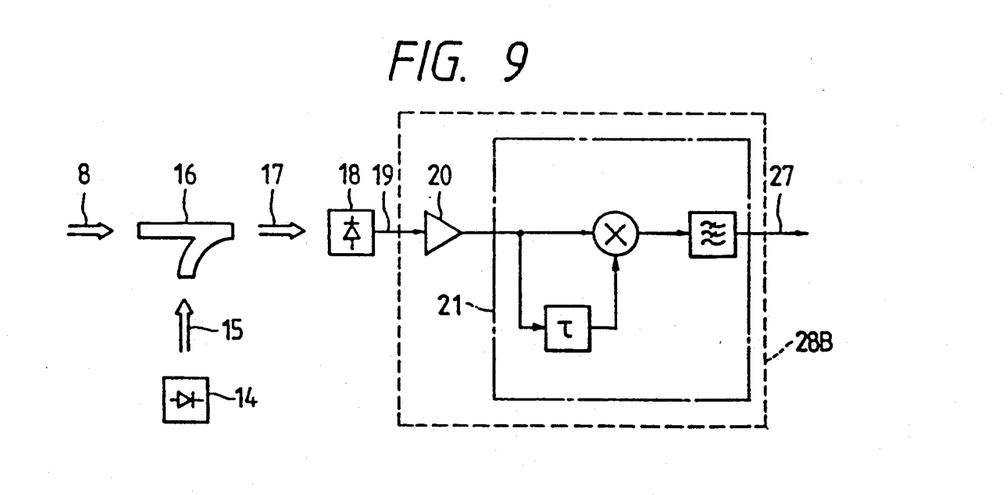
FIG. 9 shows additional details of the receiver constructed according to the present invention.

The receiver is shown more broadly in FIG. 9, wherein elements 8, 14–22 and 27 correspond with those previously described with respect to FIG. 7. The demodulator 28B is of different construction from that of FIG. 7. The delay time of the delay detector is adjusted so that the following relationship is established between the space signal frequency $f_s$ of the signal 19 and the delay time T of the delay detector 22 of the discriminator 21, and for this reason, the AMI demodulation 26 can be omitted:

$T = n/2f_s$ (n = a natural integer number or 0, and the equality includes substantially equal)

When the relationship described above is satisfied, $f_s$ is substantially in agreement with the frequency at which the output voltage of the delay detector becomes maximal or minimal. As a result, even when the frequency of the FSK electrical signal shifts either in the increasing direction with respect to $f_s$ being the center or in the decreasing direction, the output voltage of the detector shifts in the same direction. In other words, the FSK electrical signal is converted to a unipolar base band signal by the detector and becomes the demodulation signal.

Figure 10A:
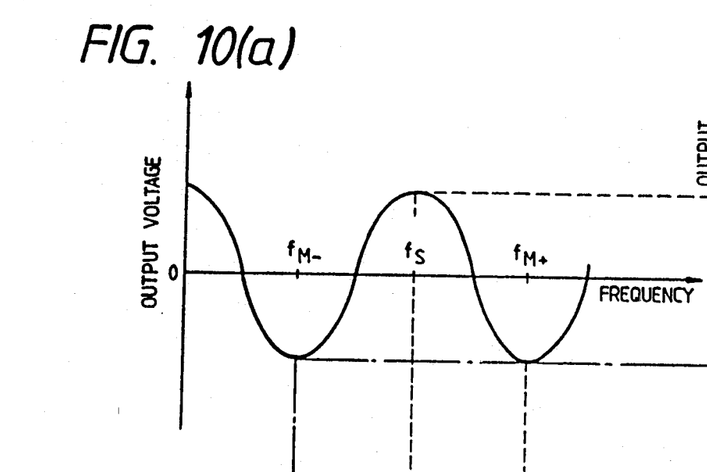
FIGS. 10(a), 10(b) and 10(c) show wave forms at different locations in the apparatus according to the present invention.
Figure 10B:
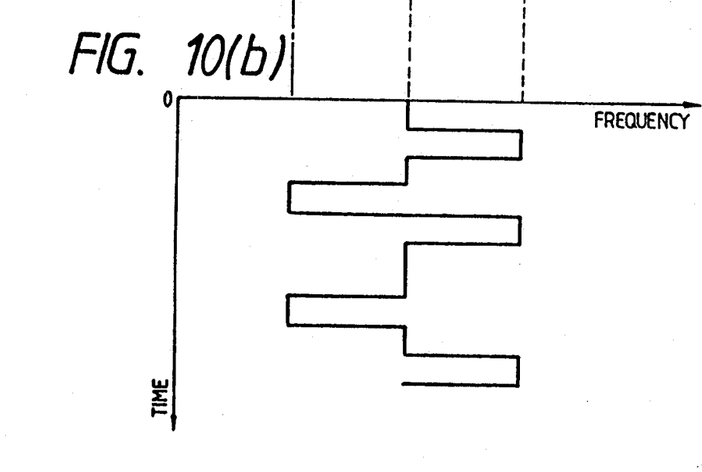
Figure 10C:
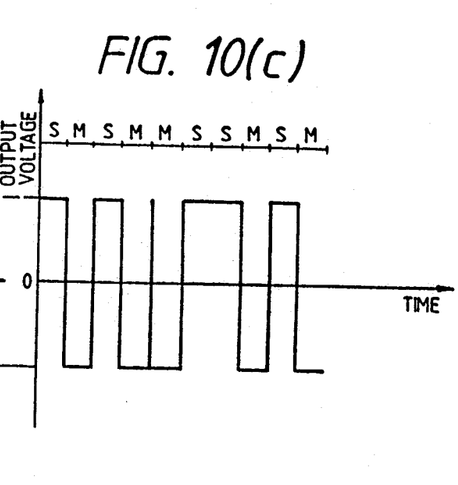

FIGS. 10(a), 10(b) and 10(c) show wave form examples where n=2. FIG. 10(a) shows the frequency discrimination characteristics of the delay detector 22. Since $f_s$ is set to be substantially in agreement with the frequency where the output voltage of the detector becomes maximal, if the frequency of the FSK electrical signal 19 shown in FIG. 10(b) shifts either to $f_{m+}$ or $f_{m-}$, the output voltage drops and exhibits the wave form shown in FIG. 10(c). In FIG. 10(c), there is shown the wave form whose polarity is opposite, but whose wave form is the same, as that of the unipolar original signal 1, in the optical transmitter of the present invention. The inversion of polarity can be accomplished easily by use of an inverter or the like, if desired.

The operation in accordance with FIG. 10(a), (b) and (c), for the optical receiver, has the same effects as previously noted and moreover provides the additional effect in the reduction of size and production cost of the optical receiver, because the AMI decoder can be omitted in the receiver.

Figure 11:
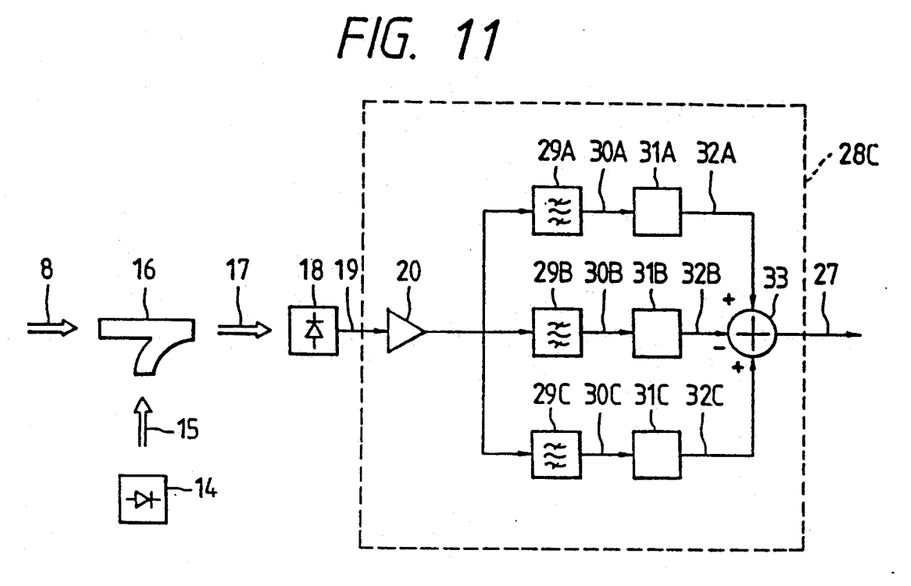
FIG. 11 shows further details of the receiver constructed according to the present invention.

FIG. 11 shows a further variation in the receiver, according to the present invention. In the drawing, elements 8, 14–20 and 27 are the same as those previously described having the same numerals. A plurality of band pass filters 29A, 29B, 29C are provided. The center frequency of filter 29A is set so as to extract only the positive mark signal from the output signal of amplifier 20, while the center frequency of band pass filter 29B is set so as to extract only the space signal. Furthermore, the center frequency of band pass filter 29C is set so as to extract only the negative mark signal. Therefore, signals 30A, 30B and 30C represent the positive mark signal, the space signal and the negative mark signal. The signals are respectively converted to base band signals 32A, 32B and 32C by respective envelope detectors 31A, 31B and 31C. The adder 33 adds the signals 32A and 32C, while subtracting the signal 32B from their sum, to output the demodulation signal 27. As a whole, the demodulator 28C is represented within the dash lines.

By comparison with the optical receivers previously described, the optical receiver of FIG. 11 provides the effect that a semiconductor laser having a wider spectrum line width can be used by the optical transmitter and the local oscillation light source. This is true, because the receiver of FIG. 11 uses the envelope detector, but not the delay detector of the previously described receivers.

In the receiver of FIG. 11, the system including 29B, 30B, 31B and 32B can be omitted or the systems 29A, 30A, 31A, 32A and 29C, 30C, 31C, 32C can be omitted, and the same effect can be obtained in such cases to a sufficient degree.

Figure 12:
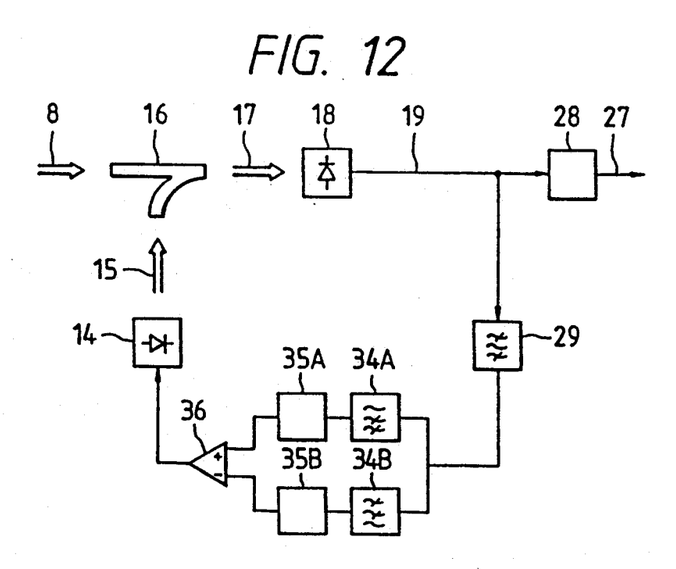
FIG. 12 is a circuit diagram showing automatic frequency control that is usable in any of the receivers according to the present invention.

FIG. 12 shows the use of automatic frequency control (AFC) in any one of the previously described receivers. In FIG. 12, elements 8, 14–19 and 27 are the same as those previously described with respect to the other optical receivers. By way of a specific example, element 28 may be anyone of the demodulators 28A, 28B or 28C. The band pass filter 29 permits the passage of only one of the positive mark signal, the space signal or the negative mark signal. By way of example, it will be considered that the space signal passes through the band pass filter 29. The space signal extracted by the filter 29 is further divided into two components, one of them being inputted to a high pass filter 34A, and the other being inputted to a low pass filter 34B.

Figure 13A:
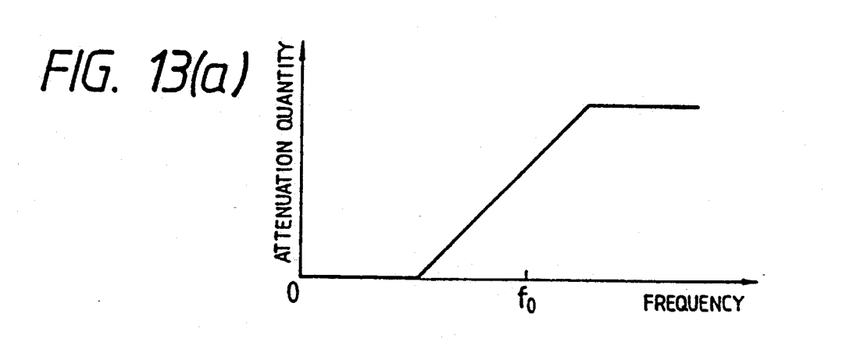
FIGS. 13(a), 13(b) and 13(c) are characteristic diagrams of filters employed in the apparatus of FIG. 12.
Figure 13B:
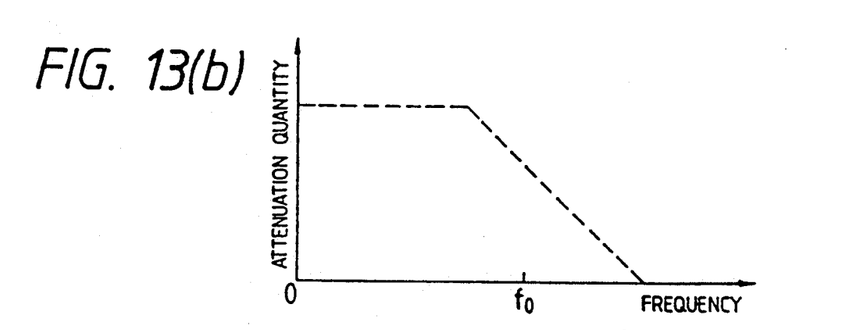
Figure 13C:
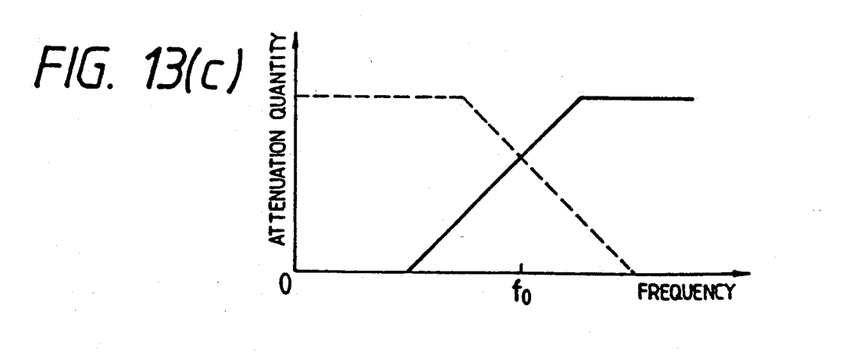

In FIG. 13(a), the characteristics of the band pass filter 34A are shown, where of is the target frequency. The characteristics of bandpass filter 34B are shown in FIG. 13(b). It is the object to bring the frequency $f_s$ close to the target frequency, $f_o$. FIG. 13(c) shows the superposition of the characteristics of bandpass filters 34A and 34B, where it is seen that the amplitude of the superposition is equal only when $f_s = f_o$, the amplitude of bandpass filter 34A is less than that of bandpass filter 34B when $f_s < f_o$; and the amplitude of bandpass filter 34A is greater than that of bandpass filter 34B when be $f_s > f_o$. In other words, if the space signal outputted from filter 29 is branched into two components and these components are passed through filters 34A and 34B, respectively, the amplitudes of the signals outputted from filters 34A and 34B become equal to each other only when $f_s = f_o$. Therefore, it is possible to bring $f_s$ close to $f_o$ by detecting the output signal amplitudes from 34A and 34B by amplitude detectors 35A and 35B, respectively, and then inputting the two amplitude signal values from the detectors 35A, 35B into the differential amplifier 36, so that its output controls the frequency of the optical local oscillator 14 in the direction where the difference of the amplitude values decreases, that is, in the direction where the output of the differential amplifier 36 decreases. In FIGS. 12, 13(a), 13(b) and 13(c), the filter 34A can be realized easily with a capacitor and the filter 34B can be realized easily with a coil, for example. Furthermore, frequency control of the optical local oscillator 14 can be realized by temperature and injection current control of the semiconductor laser or the like, according to known technology.

According to the present invention, then the frequency of the FSK electrical signal is stabilized by a simple circuit construction. This effect can be obtained similarly when the passing frequency of the filter 29 is adjusted to the frequency of the positive mark signal or the negative mark signal, and the target frequency is adjusted accordingly.

The control of FIG. 12 can also be applied to the optical receiver shown with respect to FIGS. 14–17, and the same effect can be obtained.

Figure 14:
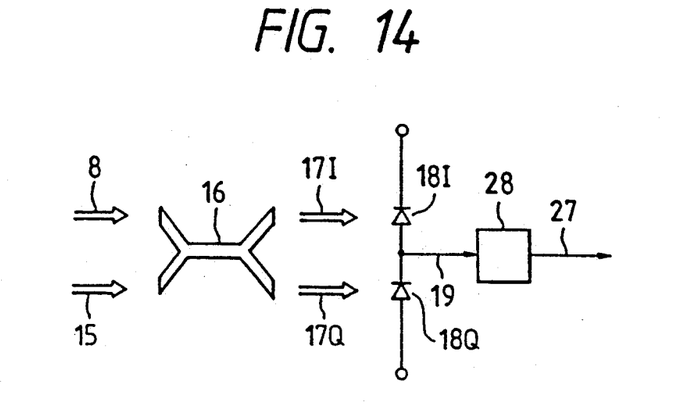
FIG. 14 shows a balanced optical receiver, according to the present invention.

In FIG. 14, a balanced optical receiver is shown and includes, in addition to previously described elements, the demodulator 28 that may be of any of the previously described constructions. The balanced optical receiver is a receiver directed to suppress intensity noise of the optical local oscillator light source and is particularly effective when the optical local oscillator power is high. The FSK optical signal 8 is combined with the optical local power of light 15 by the 3 dB optical coupler 16, and the output or combined light signal is split and outputted as light beams 17I and 17Q. These outputs 17I and 17Q are inputted to the optical detectors. 18I and 18Q, respectively where they are converted to the FSK electrical signals, and then subtracted to obtain one FSK electrical signal 19. Intensity noise is suppressed during the subtraction process, described above. The signal 19 is inputted to the demodulator 28, which outputs a demodulation signal 27 having the same wave form as the original signal, according to the previous descriptions of the demodulator 28.

Since the receiver of FIG. 14 suppresses the intensity noise of the optical local power, a signal having a high signal-to-noise ratio can be obtained. In addition, if a frequency mixer or an envelope detector is contained within the demodulator 28 and provided with amplitude square characteristics, degradation described previously can be suppressed.

Figure 15:
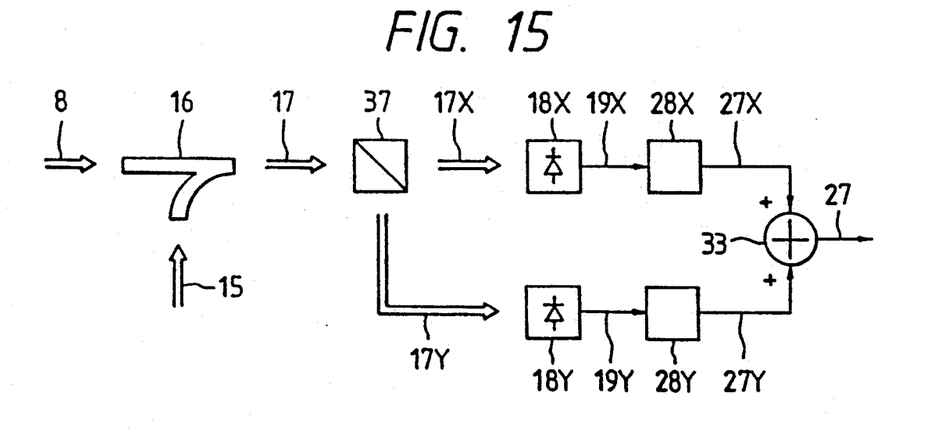
FIG. 15 shows a polarization diversity optical receiver according to the present invention.

The polarization diversity optical receiver of FIG. 15 includes the demodulator of the present invention. The polarization diversity optical receiver is a receiver directed to suppress the degradation of the signal-to-noise ratio (SNR) of the demodulation signal 27 caused by the polarization fluctuation of the FSK optical signal. The FSK optical signal 8 is combined with the optical local power light 15 by the optical coupler 16. The optical coupler 16 outputs the combined light signal 17, which is separated by the polarization beam splitter 37 into two polarization components 17X and 17Y crossing each other orthogonally. These components are inputted to the optical detectors 18X and 18Y, respectively, and converted to the FSK electrical signals 19X and 19Y. The signals 19X and 19Y are inputted to the modulators 28X and 28Y, respectively, which may be of the type of any demodulators described herein. These demodulators convert the signals respectively to demodulation signals 27X and 27Y. One demodulation signal 27 is obtained by adding the demodulation signals 27X and 27Y with the adder 33. This circuit for the receiver provides the effect that the SNR degradation of the demodulation signal caused by the polarization fluctuation of the FSK optical signal can be suppressed.

Figure 16:
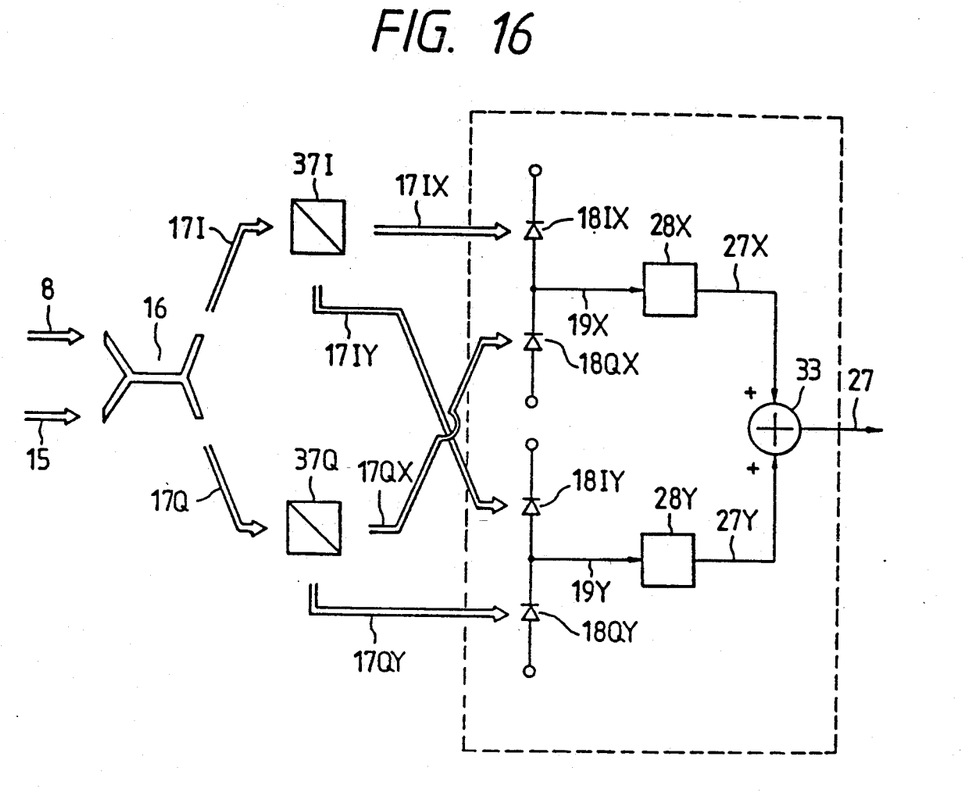
FIG. 16 shows a balanced polarization diversity optical receiver, according to the present invention.

In FIG. 16, the balanced polarization diversity optical receiver of the present invention includes the demodulator previously described above with respect to FIG. 15. FIG. 16 is a combination of the circuits of FIGS. 14 and 15, and provides the optical receiver with a combination of the balanced optical receiver and the polarization diversity optical receiver that is directed to suppress the intensity noise of the optical local power and to suppress a drop in the signal to noise ratio demodulation signal due to polarization fluctuation of the optical signal. The FSK optical signal 8 and the optical local power light signal 15 are combined by the 3 dB optical coupler 16 and the outputs 17I and 17Q are respectively fed to the polarization beam splitters 37I and 37Q, which may be of the type shown at 37 in FIG. 15. Thereby, beam 17I is separated into perpendicular polarization components 17IX and 17IY crossing each other orthogonally by a polarization beam splitter 37I, in a manner that is also true of the correspondingly labeled beams 17X and 17Y in FIG. 15. Similarly, beam 17Q is separated by the perpendicular polarization beam splitter 37Q into beams 17QX and 17QY crossing each other orthogonally. Here, the power of the local oscillator light signal 15 is distributed equally to the beams 17IX, 17IY, 17QX and 17QY. These four beams are respectively converted into electrical signals by the semiconductor optical/electrical transducers 18IX, 18QX, 18IY and 18QY, with resulting pairs of signals being combined to produce the electrical signals 19X and 19Y, according to the connection shown in FIG. 16. The resulting electrical signals 19X and 19Y are demodulated by separate demodulators 28X and 28Y, respectively, which may be of any of the types previously discussed, and the resulting demodulation signals 27X and 27Y are added by the adder 33 and then outputted as a demodulation signal 27, much in the manner of the circuit of FIG. 15. The circuit of FIG. 16 provides the effect that the intensity noise of optical local power and deterioration of the signal-to-noise ratio of the demodulation signal due to polarization fluctuation of the optical signal can be suppressed. That is, the advantages with respect to noise obtainable with FIG. 14 and the advantages with respect to polarization fluctuation obtainable with FIG. 15 are both obtainable with the circuit of FIG. 16. This effect can be obtained similarly even if the sequence in combination of the optical coupler and the polarization beam splitter are different, so long as the structure inside the dash line in FIG. 16 remains the same.

Figure 17:
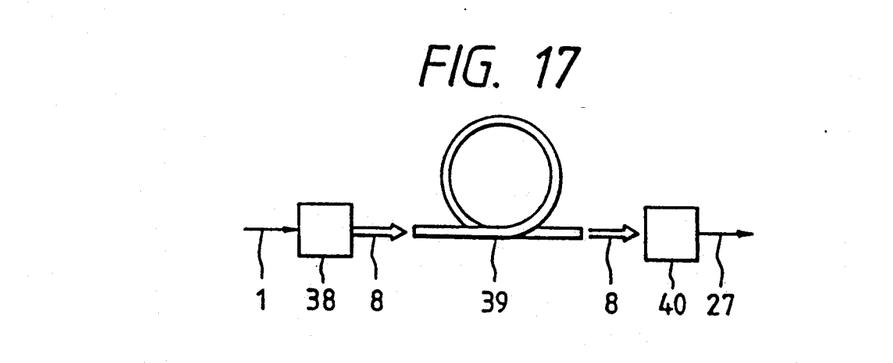
FIG. 17 broadly shows the complete optical transmission apparatus using the optical transmitter and the optical receiver of the present invention.

In FIG. 17, an optical transmission apparatus, usable between the previously described transmitter and receiver, with variations, will produce a complete system and combination. The unipolar original signal 1 is inputted to the optical transmitter 38, previously described, to output the bi-polar FSK optical signal 8. After propagating through the optical fiber 39 as a transmission path, the signal 8 is inputted to the optical receiver 40, previously described, to output the demodulation signal 27.

With the present invention, there is provided the effect that an optical transmission apparatus has less deterioration of a signal to noise ratio and has stable performance, compact size and low cost of production by the use of a semiconductor laser as the optical transmitter, when compared to conventional apparatus.

The present invention can accomplish an optical transmitter having the following effects and outputting an FSK optical signal having less wave form distortion:

(1) The production cost can be reduced because adjustment of a circuit in accordance with the characteristics of a semiconductor laser is not necessary.

(2) The power of the original signal need not be increased because of the semiconductor laser power not being lowered. That is, the electrical power of the original signal need not be increased because the efficiency of the optical frequency deviation of the semiconductor laser is not lowered.

(3) The DC level of the demodulation signal can be made constant.

(4) The present invention further provides an optical receiver having a simple construction that obtains a demodulation signal having lower optical local power source noise intensity and less deterioration of the signal-to-noise ratio due to the polarization fluctuation of an optical signal, and the further effect that the frequency of the FSK electrical signal can be stabilized by a simple circuit construction. As a result, a complete optical transmission apparatus has been described with advantages over conventional apparatus.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A transmitter for an optical coherent communication system, comprising:

an alternate mark inversion (AMI) coder converting a binary information electrical signal into an AMI code baseband electrical signal;

a superposer superposing said AMI coded baseband electrical signal on a bias current to obtain a superposition current signal; and a semiconductor laser diode driven by said superposition current signal to output an AMI coded frequency shift keying (FSK) optical signal.

2. A receiver for an optical coherent communication system, comprising:

a heterodyne detector converting an AMI coded FSK optical signal into an AMI coded FSK electrical signal, including a semiconductor laser diode producing a local optical signal, an optical coupler combining said AMI coded FSK optical signal with the local optical signal to produce a combination optical signal, and a photo diode detecting the combination optical signal to produce said AMI coded FSK electrical signal; and a frequency discriminator converting said AMI coded FSK electrical signal into a binary information electrical signal, including a divider dividing said AMI coded FSK electrical signal into two components, a delay line delaying one of said two components relative to the other of said two components by a delay time equal to about $n/2f_s$, wherein n is a positive natural number including zero and $f_s$ is the frequency corresponding to a space signal of said AMI coded FSK electrical signal, a mixer multiplying the delayed one of said two components and the other of said two components without delay to produce a multiplication component, and a low-pass filter passing the multiplication component to directly produce a binary information electrical signal without necessitating a separate AMI decoder.

3. A receiver for an optical coherent communication system, comprising:

a heterodyne detector converting an AMI coded FSK optical signal into an AMI coded FSK electrical signal, including a semiconductor laser diode producing a local optical signal, an optical coupler combining said AMI coded FSK optical signal with the local optical signal to produce a combination optical signal, and a photo diode detecting the combination optical signal to produce said AMI coded FSK electrical signal;

a band-pass filter having a band-pass frequency corresponding to a space frequency of said AMI coded FSK electrical signal for extracting a space component from the AMI coded FSK electrical signal; and an envelope detector converting the extracted space component into a binary information electrical signal.

4. An optical communication system, comprising:

a transmitter comprising, an alternate mark inversion (AMI) coder converting a binary information electrical signal into an AMI coded baseband electrical signal;

a superposer superposing said AMI coded baseband electrical signal on a bias current to obtain a superposition current signal; and a semiconductor laser diode driven by said superposition current signal to output an AMI coded frequency shift keying (FSK) optical signal;

an optical fiber transmitting said AMI coded frequency shift keying (FSK) optical signal; and a receiver comprising, a heterodyne detector converting the AMI coded FSK optical signal into an AMI coded FSK electrical signal, including a semiconductor laser diode producing a local optical signal, an optical coupler combining said AMI coded FSK optical signal with the local optical signal to produce a combination optical signal, and a photo diode detecting the combination optical signal to produce said AMI coded FSK electrical signal, and a frequency discriminator converting said AMI coded FSK electrical signal into a binary information electrical signal, including a divider dividing said AMI coded FSK electrical signal into two components, a delay line delaying one of said two components relative to the other of said two components by a delay time equal to about $n/2f_s$, wherein n is a positive natural number including zero and $f_s$ is the frequency corresponding to a space signal of said AMI coded FSK electrical signal, a mixer multiplying the delayed one of said two components and the other of said two components without delay to produce a multiplication component, and a low-pass filter passing the multiplication component to directly produce a binary information electrical signal without necessitating a separate AMI decoder.

5. An optical communication system, comprising:

a transmitter comprising:

an alternate mark inversion (AMI) coder converting a binary information electrical signal into an AMI coded baseband electrical signal, a superposer superposing said AMI coded baseband electrical signal on a bias current to obtain a superposition current signal, and a semiconductor laser diode driven by said superposition current signal to output an AMI coded frequency shift keying (FSK) optical signal;

an optical fiber transmitting said AMI coded frequency shift keying (FSK) optical signal; and a receiver comprising, a heterodyne detector converting said AMI coded frequency shift keying (FSK) optical signal into an AMI coded FSK electrical signal, including a semiconductor laser diode producing a local optical signal, an optical coupler combining said AMI coded FSK optical signal with the local optical signal to produce a combination optical signal, and a photo diode detecting the combination optical signal to produce said AMI coded FSK electrical signal, a band-pass filter having a band-pass frequency corresponding to a space frequency of said AMI coded FSK electrical signal for extracting a space component from the AMI coded FSK electrical signal, and an envelope detector converting the extracted space component into a binary information electrical signal.

* * * * *